(12) United States Patent
Taugher et al.

(10) Patent No.: US 6,266,791 B1
(45) Date of Patent: Jul. 24, 2001

(54) SYSTEM AND METHOD FOR SELECTIVELY RECOVERING AREAS ON A DISC MARKED AS UNUSEABLE

(75) Inventors: Lawrence N Taugher; Andrew J Rodgers, both of Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/245,471

(22) Filed: Feb. 5, 1999

(51) Int. Cl.[7] ....................................................... G06F 11/00
(52) U.S. Cl. ............................................. 714/710; 714/723
(58) Field of Search ..................................... 714/710, 723, 714/718

(56) References Cited

U.S. PATENT DOCUMENTS

| | | | |
|---|---|---|---|
| 4,216,541 | * | 8/1980 | Clover et al. . |
| 4,506,362 | * | 3/1985 | Morley . |
| 4,916,703 | * | 4/1990 | Christensen et al. . |
| 4,949,326 | * | 8/1990 | Takagi et al. . |
| 6,052,798 | * | 4/2000 | Jeddeloh .................................. 714/8 |

FOREIGN PATENT DOCUMENTS 0 541 219 A1 * 12/1993 (EP) .

* cited by examiner

Primary Examiner—Phung M. Chung

(57) ABSTRACT

Data is moved to an alternate storage location in a storage medium upon encountering a data integrity fault and the trouble location is blocked from further storage thereat. The troubled data is studied, using pattern recognition, in an attempt to determine if the data fault has resulted from a temporary or permanent fault condition. If a temporary condition is determined, the user is given an opportunity to correct the error condition. Upon correction, the data is returned to the trouble location for storage and the block on that location is removed.

23 Claims, 1 Drawing Sheet

SYSTEM AND METHOD FOR SELECTIVELY RECOVERING AREAS ON A DISC MARKED AS UNUSEABLE

TECHNICAL FIELD OF THE INVENTION

This invention relates to memory storage systems and methods and more particularly to a system and method for controlling the storage of data in the memory taking into account disc trouble spots.

BACKGROUND OF THE INVENTION

Presently, if memory, such as a CD, DVD or hard drive, detects a severe reading error at a particular location in the memory, it informs the host software and the host software will not use that spot again. The host remaps the memory to an alternate location as controlled by its sparing table marking the spot as bad. The memory then places new data that would have been directed to the trouble location in its sparing table. When it is desired to read data from the spot that is bad, instead of reading that spot, the memory will read the data stored at a specific area in the sparing table.

Thus, if there is a fingerprint or smudge or something on the disc, or if the disc is scratched or worn at a spot, the disc marks the trouble area as a bad area and then rewrites the data from that area to a new area. Two different situations can occur. One is contamination or errors that are temporary are those that may be removed by cleaning the disc or by doing something to the disc; and the other is a permanent defect like a scratch or the wearout mechanism of the disc that is not recoverable. Current systems treat these two cases identically since they cannot tell the difference between a fingerprint, a piece of dust, a scratch, or the wearing out of a piece of the media. In either case, the memory tells the software that it had trouble reading a particular spot and directs the software to map that spot as bad. Thus, once a spot is marked as bad it is never reused, even if, for instance, the disc is cleaned and the smudge is removed.

SUMMARY OF THE INVENTION

These and other objects, features and technical advantages are achieved by a system and method which in one embodiment takes advantage of the fact that all of the areas on the disc that are marked as bad are located in the sparing table. The system can then look at the disc and see what kind of errors occurred by mapping data back onto the disc and using pattern recognition to detect what kinds of errors they are. If it is determined that an error is recoverable, such as a fingerprint or a dust error, the user will be directed to clean the disc or other methods may be used to remove the problem. Once the disc has been cleaned, the system can check that spot to see if it is good, and if good, relocate the data back out to that previously marked bad spot. The system re-references the disc so that it points again to the trouble spot and not to the sparing table.

One of the problems that could occur with this system is that, over time, the section of data pertaining to the trouble spot may have been reused. This could occur if the data in the sparing table is changed (by update from the user) without changing the data on the disc at the spot that has been marked as bad. For example, suppose a text file is written to a disc, and a fingerprint exists on the disc at a location that is in the middle of the text file. The first one-third of the text file and the last one-third is okay as is, but the data stored at the middle one-third is difficult to read. The middle one-third of the data is then given to the computer, which acknowledges that there indeed was trouble reading that data. The computer will then take the middle one-third of the text file and place it into the sparing table. Note that now the same data resides at the trouble spot on the disc as well as in the sparing table. Whenever that text file is desired, the beginning one-third will come off the disc from the location where it normally comes from. The middle one-third of the text file will come from the sparing table (and not from its normal spot on the disc) and the last one-third will come from its original location. This data is then edited by the user, who may not even know that the memory had a problem. When the changed data goes back to the disc, the first one-third overwrites the previously saved first one-third, the middle part is written to the sparing table, and the last one-third goes back to where it was originally. The trouble spot data is not touched. Thus, the most recent copy of the middle one-third would be in the sparing table so the disc could not just be cleaned and the middle part of the disc used immediately because it could have different data from what is in the sparing table.

To fix this problem, data corresponding to trouble spots that are now good is read from the sparing table to the disc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figures 1, 2:
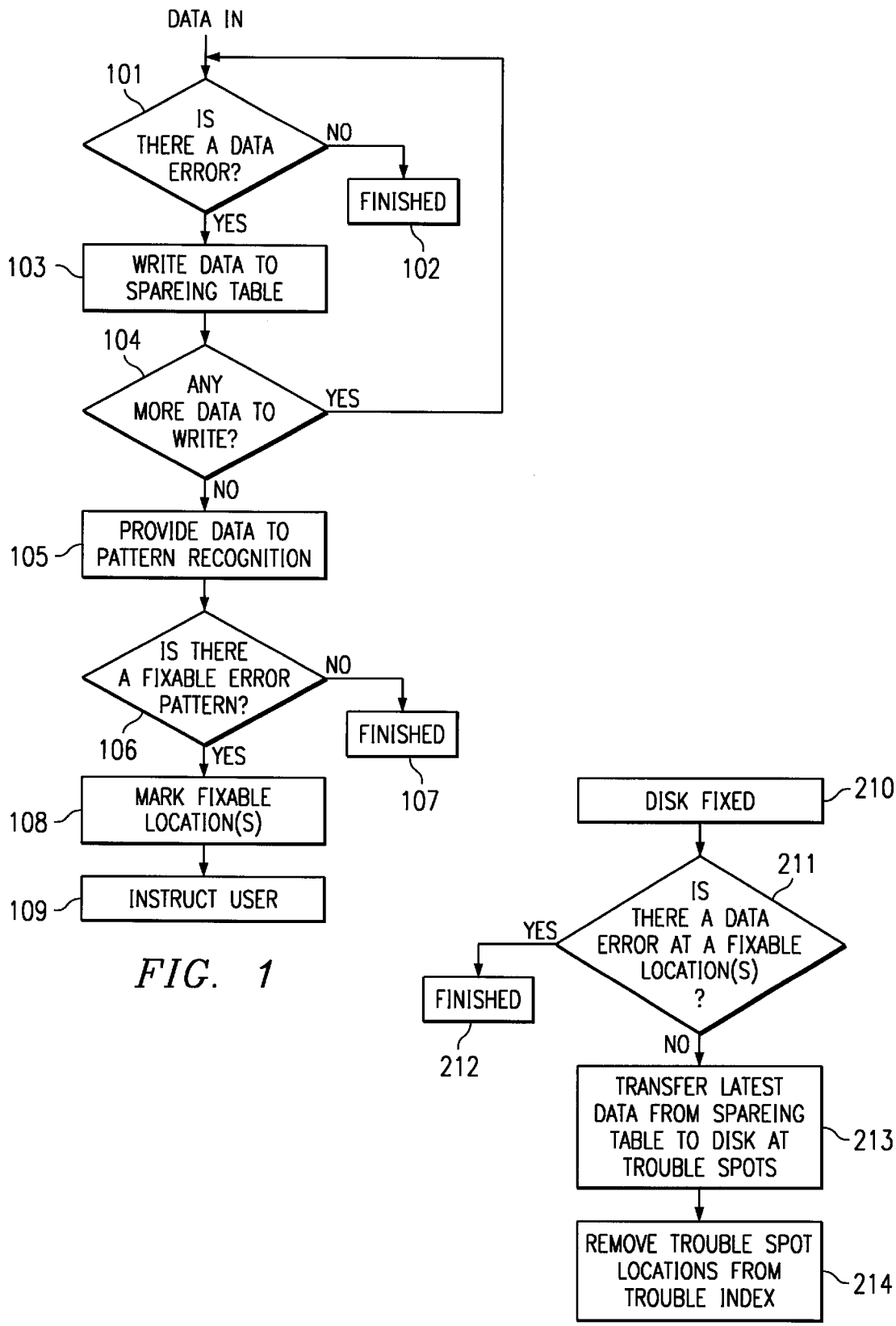
FIG. 1 shows a flow chart of system error determination.
FIG. 2 shows a flow chart of system disc corrections.

Turning now to FIG. 1, box 101 operating in conjunction with a general purpose computer, such as a PC, will, based on previous experience, know the typical pattern of a dirt speck, dust or scratch. Typically, scratches, dirt speck, dust, fingerprints, disc wearout and media defects will all provide unique patterns.

Pattern recognition will be done by software in the computer which will access the data on the sparing table and virtually map onto the disc. Then a software program looks at this virtual disc with these marks on it and analyzes the marks to correspond them to dirt, scratches, fingerprints, etc.

Typically, the sparing table is not very big. If a file is in error, the system does not have enough space to put that whole file into the sparing table. It will only spare out a frame or a sector. The system does not look at the whole disc since scanning a whole disc takes a considerable amount of time looking for bad spots. Since that work has already been done and the results put into the sparing table, the system only need review the sparing table. A refinement is that once a certain set of data has been determined to correspond to an unfixable trouble location, that set of data no longer need be looked at. From a time point of view, it is quick because it only has to read and analyze the sparing table.

Additional, if time permits the whole disc can be verified with a lower thushold for errors that would be set to spare the data. This way dirt, smudges and fingerprints could be detected before they cause a problem.

From the trouble data the pattern recognition would determine if there is a long continuous pattern of connecting locations on the disc so that it would be like a scratch, or whether it is a small area that is a close cluster like a piece of dirt. A fingerprint would be something that would be similar to a series of small scratches that are circular in nature. Disc wearout will either happen at a single spot, or it will happen along the groove. It is highly unlikely that any type of contamination will follow a single groove precisely. That is virtually impossible because it is so small.

Box 106 controls this function, and if there are not fixable errors, the system is finished, box 107. If fixable errors are determined, locations are marked, box 108, and the user is asked to take some action, box 109.

With a wearout, the system does not tell the user anything since there is nothing he/she can do about it. On a scratch, it is highly likely that the system will tell the user anything since asking most users to repair a scratch could cause a lot more damage than the scratch itself. However, for diagnostic reasons, both types of information can be made available if desired. If the errors become significant enough, the system asks the user to move data from the damaged disc to a different disc.

FIG. 2 shows the situation where the disc has been cleaned, box 210, and reinserted back into the computer, or VCR, MiniDisk or DVD player, or other device. Box 211 runs an error check of the disc to see which locations are still bad. Assuming that all locations which had been identified as fixable are now showing "good" data, the newly read data is ignored and the latest disc located in the storing table is read into the corresponding location on the disc, via box 213 and box 214. Those trouble locations are removed from the trouble index.

If only some of the trouble spots have been fixed, only data corresponding to those "fixed" spots are read back to the disc.

Although the present invention and its advantages have been described in detail, it should be understood that various changes, substitutions and alterations can be made herein without departing from the spirit and scope of the invention as defined by the appended claims.

What is claimed is:

1. A method of storing data on a physical medium, said method comprising the steps of:
   detecting an error condition at a particular medium location;
   storing error condition data that would otherwise be stored at said particular location at a different medium location; and
   analyzing data stored at said different location to determine a probable cause of said error condition, wherein said analyzing step includes matching said error condition data against certain patterns of error condition data.

2. The method set forth in claim 1 further including the step of:
   informing a user that a fixable error has occurred.

3. The method of claim 1 further including the step of:
   informing a user of determined probable causes of error.

4. The method of claim 1 further including the step of:
   informing a user of all of the error types found together with the location of the error.

5. The method of claim 1 wherein the physical media is selected from the list consisting of.
   CDs, DVDs, CDROMs, VCR tapes, magnetic discs, MiniDisks.

6. The method of claim 1 further including the step of:
   determining when the trouble condition with respect to said particular location has been cleared.

7. The method of claim 1 fiurter including the step of:
   transferring the data from said different location to said particular location when said trouble condition at said particular location has been determined to have been cleared.

8. The method of claim 1 further including the step of.
   upon a detection of a non-error condition at a particular location where error conditions were previously detected resorting said particular location so that data can again be stored thereat.

9. The method of claim 1 wherein said detecting step includes the step of increasing the sensitivity to errors to a point higher than normal for certain periods of time.

10. The method of claim 1, wherein said certain patterns of error condition data include:
    long continuous pattern;
    close cluster pattern;
    circular series pattern;
    single spot pattern; and
    contiguous grove pattern.

11. A system for fixing data errors in a memory, said system comprising:
    an error detection portion for determining when an error has occurred with respect to certain positions in said memory;
    an error analyzing portion for determining the probable cause of each detected error, wherein said error analyzing portion includes a portion for matching each said detected error against known error patterns to determine if a match exists; and
    a notification portion for communicating certain error conditions to a user based upon the determined probable cause of said certain error.

12. The system of claim 11 wherein said notification portion includes a portion for notifying said user of the probable cause of every detected error.

13. The system of claim 11 further including a portion for taking certain locations of said memory out of service when errors have been detected at said certain locations.

14. The system of claim 13 further including a portion for restoring to service any memory location which has subsequently been found to be error free.

15. The system of claim 11 wherein said known error patterns include:
    long continuous pattern;
    close cluster pattern;
    circular series pattern;
    single spot pattern; and
    contiguous grove pattern.

16. A system for fixing data errors in a memory, said system comprising:
    means for determining when an error has occurred with respect to certain positions in said memory;

an error analyzing means for determining the probable cause of each detected error, wherein said error analyzing means includes means for matching each said detected error against known error patterns to determine if a match exists; and means for communicating certain error conditions to a user based upon the determined probable cause of said certain error.

17. The system of claim 16 wherein said notification means includes means for notifying said user of the probable cause of every detected error.

18. The system of claim 16 further including:

means for taking certain locations of said memory out of service when errors have been detected at said certain locations.

19. The system of claim 18 further including:

means for restoring to service any memory location which has subsequently be en found to be error free.

20. The system of claim 16 wherein said known error patterns include:

long continuous pattern;

close cluster pattern;

circular series pattern;

single spot pattern; and contiguous grove pattern.

21. A method for fixing data errors in a memory, said method comprising the steps of:

determining when an error has occurred with respect to certain positions in said memory;

analyzing the probable cause of each detected error, wherein said error analyzing step includes matching each said detected error against known error patterns to determine if a match exists; and communicating certain error conditions to a user based upon the determined probable cause of said certain error.

22. The method of claim 21 wherein said notification step includes notifying said user of the probable cause of every detected error.

23. The method of claim 21 wherein said known error patterns include:

long continuous pattern;

close cluster pattern;

circular series pattern;

single spot pattern; and contiguous grove pattern.

* * * * *

UNITED STATES PATENT AND TRADEMARK OFFICE
CERTIFICATE OF CORRECTION

PATENT NO.    : 6,266,791 B1
DATED         : July 24, 2001
INVENTOR(S)   : Lawrence N. Taugher et al.

It is certified that error appears in the above-identified patent and that said Letters Patent is hereby corrected as shown below:

Column 4,
Line 13, delete "claim 1 fiurter" and insert -- therefor -- claim 6 further --
Line 27, after "claim 1" delete ","

Column 5,
Line 18, delete "be en" and insert therefor -- been --

Signed and Sealed this

Fifth Day of November, 2002

Attest:

Attesting Officer

JAMES E. ROGAN
Director of the United States Patent and Trademark Office